United States Patent
Hilgraf (12) 
(10) Patent No.: US 7,144,204 B2
(45) Date of Patent: Dec. 5, 2006

(54) PNEUMATIC CONVEYOR DEVICE AND METHOD

(75) Inventor: Peter Hilgraf, Hamburg (DE)

(73) Assignee: Claudius Peters Technologies GmbH, Buxtehude (DE)

( * ) Notice: Subject to any disclaimer, the term of this patent is extended or adjusted under 35 U.S.C. 154(b) by 0 days.

(21) Appl. No.: 10/490,341

(22) PCT Filed: Sep. 20, 2002

(86) PCT No.: PCT/EP02/10588

§ 371 (c)(1),
(2), (4) Date: Sep. 29, 2004

(87) PCT Pub. No.: WO03/026991

PCT Pub. Date: Apr. 3, 2003

(65) Prior Publication Data

US 2005/0042041 A1    Feb. 24, 2005

(30) Foreign Application Priority Data

Sep. 21, 2001   (EP)   ................... 01122763

(51) Int. Cl.
*B65G 53/04* (2006.01)

(52) U.S. Cl. ............................ 406/95; 406/83; 406/89; 406/128; 406/144

(58) Field of Classification Search .................. 406/93, 406/94, 95, 63, 83, 89, 128, 144

See application file for complete search history.

(56) References Cited

U.S. PATENT DOCUMENTS

| 366,919 | A | * | 7/1887 | Budd | ............................ 406/89 |
| 2,527,488 | A | * | 10/1950 | Schemm | ...................... 406/89 |
| 2,802,698 | A | * | 8/1957 | Krauss | ........................ 406/89 |

(Continued)

FOREIGN PATENT DOCUMENTS

DE    1150 320    6/1963

(Continued)

*Primary Examiner*—Joe Dillon, Jr.
(74) *Attorney, Agent, or Firm*—Morrison & Foerster LLP (57) ABSTRACT

The invention relates to a device for the pneumatic conveyance of bulk material, including a conveying pipe which defines a conveying path for the bulk material and in portions has a fluidizing pipe segment and a propellant gas source which is connected to the conveying pipe and is designed for the supply of propellant gas in the direction of the conveying path. The conveying pipe is provided with a fluidizing pipe segment at least in the region of a bulk material feed means and, if appropriate, also at further critical portions of the conveying pipe, in particular upstream of deflection points. As a result, the bulk material, which is often encountered there in a high concentration, can be fluidized, with the result that it can be conveyed, with low friction, at relatively low gas velocities. The invention relates, furthermore, to a corresponding conveying method.

11 Claims, 4 Drawing Sheets

U.S. PATENT DOCUMENTS

| | | | | |
|---|---|---|---|---|
| 2,813,630 A | * | 11/1957 | Morrow | 209/474 |
| 2,868,590 A | * | 1/1959 | Allen et al. | 406/90 |
| 2,874,999 A | * | 2/1959 | Lofgren | 406/95 |
| 2,919,159 A | * | 12/1959 | Lacroix | 406/137 |
| 3,056,632 A | | 10/1962 | Isler et al. | |
| 3,389,076 A | * | 6/1968 | Oldweiler | 208/127 |
| 3,929,379 A | * | 12/1975 | Krambrock | 406/95 |
| 4,183,702 A | * | 1/1980 | Bonnel | 406/56 |
| 4,389,143 A | * | 6/1983 | Nadin et al. | 406/197 |
| 4,715,748 A | * | 12/1987 | Krambrock | 406/11 |
| 4,715,749 A | * | 12/1987 | Hoppe et al. | 406/14 |
| 4,936,715 A | * | 6/1990 | Wolf et al. | 406/14 |
| 5,775,851 A | * | 7/1998 | Waeschle et al. | 406/14 |
| 6,386,800 B1 | * | 5/2002 | van Eyck | 406/95 |
| 6,609,871 B1 | * | 8/2003 | Pfeiffer et al. | 414/328 |

FOREIGN PATENT DOCUMENTS

| | | |
|---|---|---|
| DE | 35 35 093 A1 | 4/1987 |
| EP | 0987 202 A2 | 3/2000 |

* cited by examiner

PNEUMATIC CONVEYOR DEVICE AND METHOD

FIELD AND BACKGROUND OF THE INVENTION

The invention relates to a device for the pneumatic conveyance of bulk material, with a conveying pipe which defines any desired conveying path for the bulk material, and with a propellant gas source which is connected to the conveying pipe and is designed for the supply of propellant gas in the direction of the conveying path, and to a corresponding method.

For the conveyance of granular or pulverulent material (bulk material), pneumatic conveying devices are known from prior public use. At a feed point, the bulk material to be conveyed is supplied to the conveying device, by which it is then transported by means of a gas stream in a conveying pipeline to a discharge point. This gas stream (propellant gas) may be generated by suction or by pressure; either a suction or a pneumatic pressure conveying device is referred to. These pneumatic conveying devices make it possible to transport the bulk material along virtually any desired path from the feed point to the discharge point. In this case, considerable height differences can be overcome, in particular the discharge point may even lie at higher levels than the feed point for the bulk material. Pneumatic conveying devices present difficulties particularly at those points where the bulk material to be conveyed occurs in a high concentration, for example at the feed point. So that this locally increased bulk material quantity can be absorbed into the propellant gas stream, the propellant gas must have a considerable minimum gas velocity. Providing the propellant gas stream with an appropriately high velocity is complicated, specifically both in structural terms, particularly with regard to the size of the pressure generator and filter required, and from cost standpoints, particularly with regard to the energy outlay required.

There is another known type of pneumatic conveying devices which manage with relatively low gas streams and consequently also with small-dimensioned blowers. These conveying devices are what may be referred to as pneumatic conveying troughs. These conveying troughs, also designated as air slides, have a porous bottom, through which blower air or gas is supplied. The pulverulent or fine-granular bulk material is thereby transformed into a flowable state along the conveying zone. In order to transport the bulk material thus fluidized, the pneumatic conveying trough must be arranged at an inclination. The driving force which acts in this case is gravitational force, so that the fluidized bulk material flows downward, following the inclination. The gas requirement of the pneumatic conveying troughs is insignificant, since the gas is used merely for fluidization, not for driving. This has, however, the serious disadvantage that the bulk material cannot be conveyed in any desired direction, but only ever downward.

Various attempts have been made to combine the advantages of the different types of pneumatic conveying devices with one another. Thus, DE-A-11 50 320 discloses a conveying device, in which a pneumatic conveying trough has been extended in the upper space of the conveying trough in order to accommodate an additional suction system. As a result, a vacuum directed toward the end of the conveying trough is generated, thereby assisting a movement of the bulk material along the conveying trough. It is thereby possible that this conveying trough can not only convey in the downward direction, but also at the same level. However, so that this advantageous action can be established, a defined vacuum distribution must be maintained along the conveying trough. For this purpose, it is necessary to subdivide the supplies for the fluidizing gas into individual chambers, and these chambers may not be of equal size, but are smaller at the start of the conveying zone and larger toward the end of the conveying zone. In addition, an inlet valve, through which air can be sucked out of the atmosphere into the conveying trough, is arranged at the start of the conveying zone. This conveying device has a disadvantage that the entire conveying trough has to be provided with fluidizing gas supplies which also have to be designed differently, depending on their position along the conveying trough. Furthermore, the conveying capacity of the conveying trough is very low, since no active propellant gas stream is used, but, instead, there is merely suction via a vacuum. Moreover, vacuum suction often entails the disadvantage that bulk material can easily be sucked into the vacuum system and may lead to wear or defects there. Similar, but simpler devices are described in DE-A-35 35 093 and U.S. Pat. No. 3,056,632. In these, the conveying pipe is provided along its entire length with gas supply means at its lower space. Compressed air is blown into the conveying trough via these means, the pressure conditions being set such that the pressure is highest at the start of the conveying line and gradually falls further along the conveying line. This pressure gradient gives rise to a gas movement in the direction of the conveying trough, with the result that the bulk material is transported in this direction. These devices, too, have the disadvantage that they are complicated, since they require injection means along the entire length of the conveying pipe. A variant of these conveying devices is disclosed in U.S. Pat. No. 2,874,999, in which, however, the supply of fluidizing gas is provided solely in the region of the bulk material feed means and not along the actual conveying pipe.

A further pneumatic conveying device is described in EP-A-0 987 202. In this device, the conveying pipe is provided along its entire length with fluidizing gas supplies on its underside. These are connected to a fluidizing gas source via an overflow valve. The overflow valves are designed in such a way that they close during normal operation and open only as slug is formed in the region of the respective fluidizing gas supply, due to the pressure differences caused as a result of this, serves to allow fluidizing gas to flow in and so as thereby to dissolve the slug. A continuous fluidization of the bulk material to simplify conveyance is not provided.

A further conveying device is known from U.S. Pat. No. 2,919,159. In this, the conveying pipe is not provided with fluidizing gas means along its entire length, but only partially, specifically only at those points where the conveying pipe runs at an upward inclination. This is intended to prevent formation of slugs at these points. Fluidization is therefore provided only partially, to be precise at portions of the inclined section which are particularly at risk. Transport otherwise takes place by means of propellant gas. In order to achieve a sufficient transport capacity in this case, the propellant gas must have a considerable minimum gas velocity. This entails a considerable outlay in terms of the construction and operation of the propellant gas arrangement.

SUMMARY OF THE INVENTION

Proceeding from a conveying device according to U.S. Pat. No. 2,919,159, the object on which the invention is based is to achieve a reliable transport of the bulk material, along with reduced propellant gas requirement.

The solution according to the invention lies in a device which includes a conveying pipe which defines a conveying path for the bulk material and includes in at least a portion a fluidizing pipe segment, a propellant gas source which is connected to the conveying pipe and is configured so as to supply propellant gas in the direction of the conveying path and a bulk material feed means disposed in a region near the fluidizing pipe segment. The invention also resides in a method having the features of supplying propellant gas into the conveying pipe to produce a propellant gas stream flowing along the conveying path, feeding the bulk material into the propellant gas stream in the conveying pipe and supplying portions of fluidizing gas into the conveying pipe transversely to the conveying path so that the bulk material is fluidized when being fed into the conveying pipe. Advantageous developments may be gathered from the more detailed embodiments described and claimed herein.

According to the invention, in a device for the pneumatic conveyance of bulk material, with a conveying pipe which defines a conveying path for the bulk material and in portions has a fluidizing pipe segment, and with a propellant gas source which is connected to the conveying pipe and is designed for the supply of propellant gas in the direction of the conveying path, there is provision for the conveying pipe to be provided with a fluidizing pipe segment at least in the region of a bulk material feed means.

Some terms must first be explained below:

Bulk material is understood to mean smaller-sized material, in particular in pulverulent or granular form.

A conveying pipe is understood to mean a line which is closed all-round and along the center axis of which conveyable material can be transported. It often has a round configuration, but this is not absolutely necessary; it may also be of another configuration, for example four-cornered. The conveying pipe may consist of straight or curved portions, and, furthermore, branch points may be provided.

A conveying path is understood to mean a path to be predetermined by the arrangement of the conveying pipes and along which the conveyable material is transported by the conveying pipes. The conveying path has one direction; its direction is that of the conveyable material when the conveying device is operating normally. Thus, a feed point for the bulk material is arranged on the conveying path at the front and a discharge point is arranged on the conveying path at the rear. The feed means may have a funnel, an X-pump, as it may be referred to, or a pressure vessel.

A propellant gas is understood to mean the gas which is introduced into the conveying pipe at the start of the conveying path and flows in the axial direction of the conveying pipe and serves for exerting a driving force on the bulk material to be conveyed.

The term "in portions" is understood to mean that at least one, albeit small, portion of limited length, with a ventilation bottom, and at least one further portion, in which there is no ventilation bottom, are present.

Fluidizing gas is understood to mean a gas which is administered to the conveying pipe transversely to the conveying pipe and serves for liquefying (fluidizing) the bulk material to be conveyed.

What is achieved by the fluidizing pipe segments is that the bulk material can be conveyed more easily, that is to say with less propellant gas. By means of the fluidizing gas supplied, a fluidized bed is generated in the material to be conveyed. By virtue of the fluidized bed, the bulk material behaves in a similar way to a fluid, and it is therefore referred to as being fluidized. Owing to the fluidization, the internal friction of the bulk material decreases sharply, that is to say the angle of friction approaches zero. As a consequence of this, only a relatively low velocity of the propellant gas is sufficient in order to absorb the bulk material and move it in the conveying direction. It is substantially lower than that minimum gas velocity which would conventionally be required in pneumatic conveying devices, without a fluidized bed being generated. This affords the advantage that, particularly where pressure conveyance is concerned, the total gas requirement is lower than in conventional pipe-type conveying devices. On account of this, the gas supply and disposal components for the conveying device can have a smaller dimensioning, along with a correspondingly lower outlay in terms of production and operation.

According to the invention, there is provision for a fluidizing pipe segment to be arranged in the region of a bulk material feed means. As a result, the minimum stream or minimum velocity of the propellant gas necessary for the reliable absorption of the bulk material in the gas stream can be markedly reduced. The invention makes use of the fact that, at this point which is critical because of the bulk material feed and at which the bulk material occurs in a particularly high concentration, a good fluidization of the bulk material can be achieved from the outset, owing to the arrangement of a fluidizing pipe segment, so that the inventive action of the fluidization in portions and of the resulting lower propellant gas requirement can be fully deployed immediately from the outset. What is achieved thereby is that the minimum velocity necessary for absorbing the bulk material into the gas stream is markedly reduced. By virtue of the invention, it is even possible to arrange the conveying pipe horizontally or at an upward inclination in this portion. In contrast to the pneumatic conveying devices which are known from the prior art and in which the bulk material feed means is normally arranged at a downwardly inclined portion, in the conveying device according to the invention the bulk material feed means can be arranged in a horizontal or even upwardly inclined portion of the conveying pipe. This allows a substantially freer configuration in the choice of the conveying path.

The invention has recognized that, by means of the device according to the invention, the advantages of the conventional pneumatic pipe-type conveying device in terms of the choice of any desired conveying path, including ascents, can be combined with those of pneumatic conveying troughs in terms of a lower gas consumption.

Furthermore, the conveying device according to the invention has the advantage that, by virtue of the fluidization and the resulting lower minimum gas velocity, only minor pressure differences are required along the entire conveying path. These minor pressure differences not only can be generated at a lower outlay, but also make it possible to achieve more stable operation. The insignificant pressure differences according to the invention allow a lower minimum velocity, with the result that the safety margin between the conveying velocity and the minimum velocity increases. In the case of high pressure differences along the conveying path, a high minimum velocity is required. It entails an increased risk that pressure oscillations (pulsations) will occur, which may lead to impairments in operational reliability as far as damage to the conveying device.

The invention recognized, furthermore, that, by the fluidizing pipe segments being arranged in portions, that is to say not continuously, both the outlay in terms of production and operation can be reduced and also operational reliability can be increased, as compared with continuous fluidization, as in pneumatic conveying troughs. If the fluidizing pipe segments were arranged continuously, the consumption of fluidizing gas would be increased substantially, with the result that the outlay would rise.

By the fluidizing pipe segments being arranged only in portions, the pressure loss can be reduced in a controlled manner in those regions where the bulk material occurs with a high concentration. This would result per se in a higher flow resistance and consequently a higher pressure loss in this region. By means of the fluidizing pipe segment, however, due to fluidization, the internal friction of the bulk material in this region is lowered. The rise in the flow resistance and in the pressure loss is consequently counteractive. The pressure loss differences along the conveying path are thereby minimized. By contrast, in a continuous arrangement of the fluidizing pipe segments, the pressure loss would also be reduced in those regions of the conveying path where the bulk material does not occur in a high concentration, that is to say where the pressure loss was in any case already low; the pressure loss differences would rise again as a result. The risk of operating faults due to pulsations, such as occurred due to abrupt changes in resistance which may lead to a formation of slugs or to a segregation of bulk material and gas stream, is counteracted. It is particularly expedient, therefore, to arrange the fluidizing pipe segments according to the invention in risky portions where the bulk material may occur in a high concentration. This refers particularly to the region of bulk material feed or else to certain regions having long straight sections.

In an advantageous embodiment, the fluidizing pipe segment has a ventilation bottom with a fluidizing gas supply. A fluidization of the bulk material can consequently be achieved in a structurally simple way. Preferably, the ventilation bottom, on its side facing the inside of the pipe, mates, flush, with the inner surface of the pipe wall, so that, even in the fluidizing pipe segment, the full cross section of the conveying pipe is available for the bulk material.

Expediently, the longitudinal dimensions of the ventilation bottom are selected such that it extends downstream of the supply of the bulk material feed means by the amount of a defined follow-up section. This takes account of the fact that the bulk material jet emerging from the supply of the bulk material feed means is often driven in a conveying direction and fanned open by the propellant gas flowing in the conveying pipe. What is achieved by the follow-up section of the ventilation bottom is that even that part of the bulk material jet which is driven in the conveying direction still impinges in the fluidizing pipe section and can consequently easily be absorbed into the propellant gas stream.

Preferably, a plurality of bulk material feed means are arranged at an interval such that adjacent fluidizing pipe segments are continuous to one another. This results in a continuous fluidizing pipe segment over the region of the plurality of bulk material feed means. What is ensured thereby is that the bulk material applied falls onto the fluidizing pipe segments and can easily be absorbed into the propellant gas stream by these. The risk of blockages is thereby forestalled.

In an advantageous embodiment, a fluidizing pipe segment is arranged at a slug formation point. A slug formation point is understood to mean a point at which compactions or deposits of bulk material are formed during operation, without the arrangement according to the invention of the fluidizing pipe segment. Such compactions of bulk material occur particularly easily in long straight pipe sections without any change of direction or in the regions following a cross-sectional widening or a deflection element, such as, for example, a bend. Due to the lack of turbulence in the propellant gas stream, sometimes stationary or unevenly running skeins of bulk material may form there and grow in the course of time. When these skeins reach a critical size (approximately half the pipe cross section), these skeins are pushed together, thus resulting in sudden slug formation. The slugs may lead to the blockage of the line or else to severe (pressure) knocks in the conveying pipe, especially when the slugs run to following narrows or bends. Owing to the use of the fluidizing pipe segments according to the invention at defined intervals on such straight pipe sections, the undesirable accumulation of bulk material in the form of skeins can be prevented.

For this purpose, expediently, the fluidizing pipe segment is arranged so as to be spaced apart from a deflection element or a widening of the conveying pipe. This is expedient particularly in the case of long horizontal sections, in order to counteract slug formation, as explained above.

The invention also extends to a corresponding method for the pneumatic conveyance of bulk material in a conveying pipe along a conveying path, with the steps of the supply of propellant gas in the conveying pipe, so that a propellant gas stream flowing along the conveying path arises, the feed of bulk material into the propellant gas stream in the conveying pipe and the supply, in portions, of fluidizing gas into the conveying pipe transversely to the conveying path in such a way that the bulk material is fluidized even when being fed into the conveying pipe.

BRIEF DESCRIPTION OF THE DRAWINGS

The invention is described below with reference to the accompanying drawing which illustrates an advantageous exemplary embodiment of the invention and in which.

DETAILED DESCRIPTION OF THE INVENTION

Figure 1:
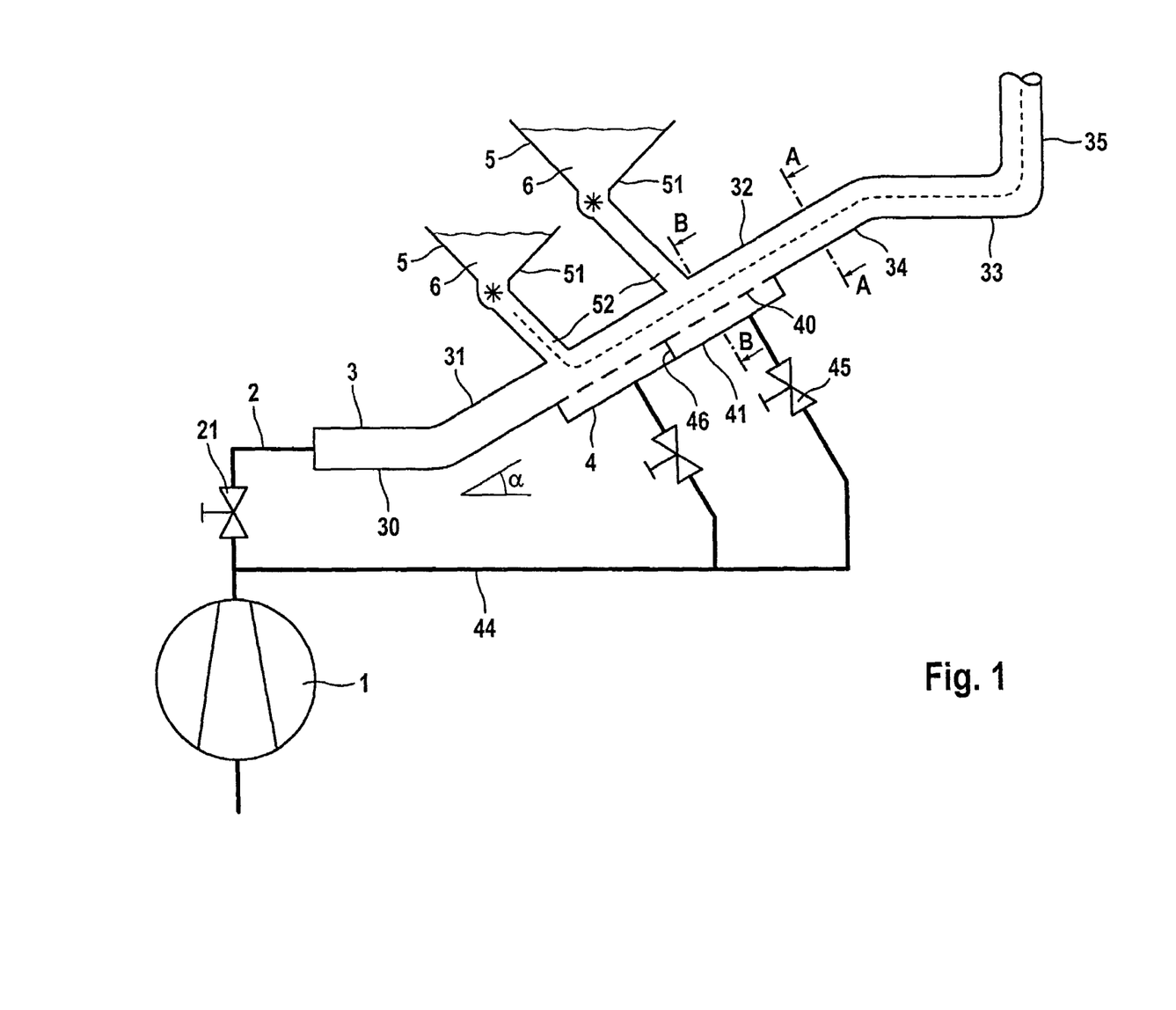
FIG. 1 shows a diagrammatic illustration of a device according to the invention.

A pneumatic device is illustrated in the exemplary embodiment according to FIG. 1. It consists of an elongate conveying pipe 3, at the start of which is connected a supply line 2, through which propellant gas under excess pressure is blown into the conveying pipe 3 by a blower 1. To regulate the supply of propellant gas, an adjusting valve 21 is arranged in the supply line 2.

The conveying pipe 3, only part of which is illustrated, has a plurality of portions 30 to 35. In its first portion 30, it runs horizontally, while the portions 31 to 34 run at an inclination upward by the amount of an elevation angle a. The portion 34 is followed by a portion 35 running vertically upward; the further run of the conveying pipe 3 is not illustrated. The conveying pipe is given the reference symbol 33.

Two bulk material feed means 5 are provided for supplying the bulk material. These may be containers which have a funnel-like shape at their lower end 51. The tip of this funnel-like shape 51 has adjoining it a short delivery line 52 which issues on the top side of the conveying pipe 3 in the portion 32. Bulk material 6 can be introduced into the conveying pipe 3 of the conveying device by this bulk material feed means 5.

The conveying pipe 3 is configured, in the portion 32, as a fluidizing pipe segment 4. For this purpose, the conveying pipe 3 has, in the portion 32, a sieve-like configuration in its lower circumferential region, in order thereby to form a ventilation surface 40. The ventilation surface 40 is surrounded outwardly by an outer wall 41 which has a configuration which is congruent to the ventilation surface 40 and which resembles an arc of a circle in cross section. Between the ventilation surface 40 and the outer wall 41 is formed a trough-like space 42, to which fluidizing gas is supplied via a supply connection 43 and out of which is passes through the ventilation surface 40 into the conveying pipe 3. One end of a supply line 44 is connected to the supply connection 43 via an adjusting valve 45. A fluidizing gas source is connected to the other end of the supply line 44. In the exemplary embodiment illustrated, there is no specific fluidizing gas source provided, but, instead, the supply line 44 is connected to the outlet of the blower 1 for the propellant gas. Since the same gas source is used for the propellant gas and for the fluidizing gas, the outlay in construction terms for the conveying device according to the invention can be further reduced.

Figure 2:
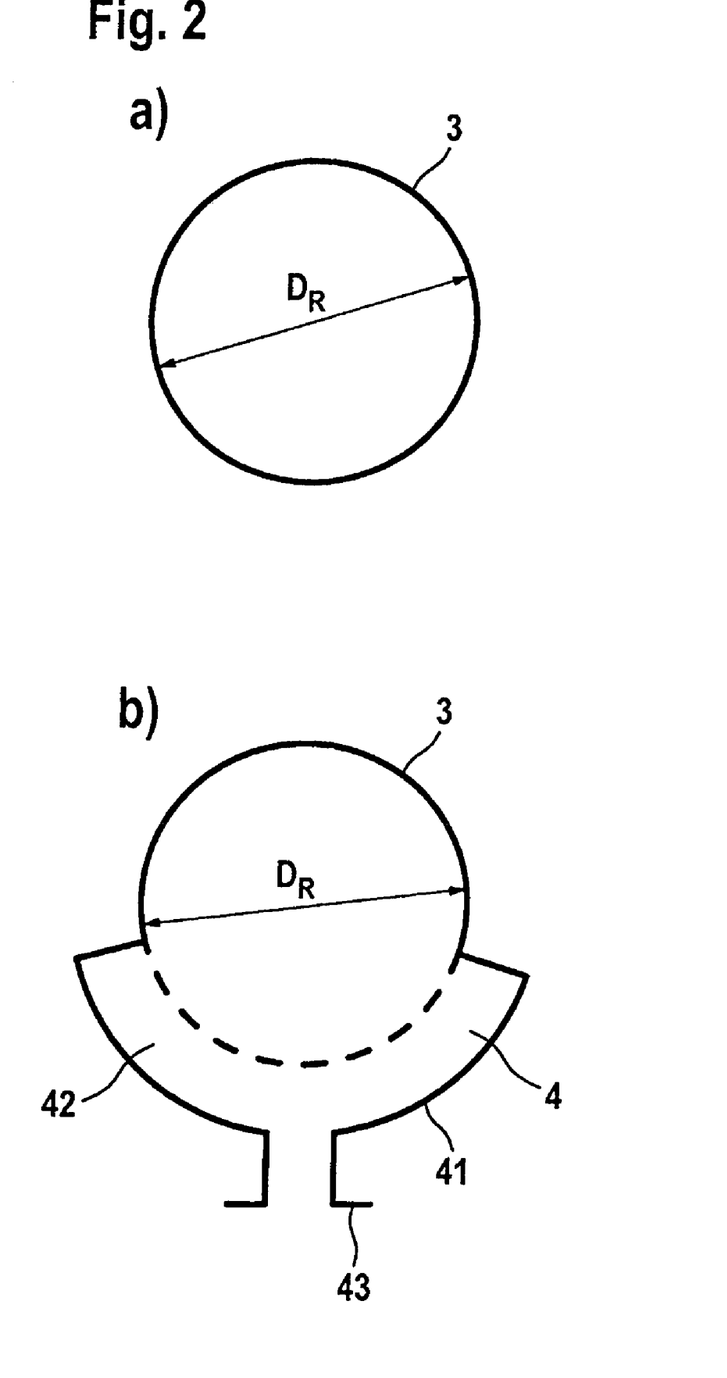
FIG. 2 shows cross-sectional illustrations through a conveying pipe of the conveying device according to the invention at two different points.

FIG. 2a illustrates a cross section in the conveying pipe at the point A—A. The conveying pipe 3 is of circular configuration and has an inside diameter DR. This cross section of the conveying pipe 3 stands as an example of all the portions in which the conveying pipe 3 is not designed as a fluidizing segment 4. It goes without saying that the diameter of the conveying pipe does not have to be the same along the entire conveying path. It may vary, in particular be widened in steps in the conveying direction. FIG. 2b illustrates a cross section of the conveying pipe 3 at the point B—B. The inside diameter of the conveying pipe 3 is again DR, but the conveying pipe does not have a continuous wall in its lower circumferential region, but instead the sieve-like ventilation surface 40. The sieve-like ventilation surface 40 is in this case curved in the form of an arc of a circle and continues the circular shape in the conveying tube 3 in this region. Below the ventilation surface 40 is arranged an outer wall 41 which surrounds the ventilation surface 40 outwardly. As a result, between the ventilation surface 40 and the outer wall 41, the lower space 42 is formed, which has a configuration resembling an arc of a circle in cross section. As can be seen from a comparison of FIGS. 2a and 2b, the ventilation surface 40 is in an alignment with the conveying pipe without a ventilation surface, so that a virtually edgeless transition between the portions with or without a ventilation surface 40 is obtained. Owing to the aligned design, a disturbance of the gas stream is avoided. At the lowest point of the outer wall 41, the supply connection 43 is arranged. The latter has connected to it, via a fluidizing gas line 44 having a regulating valve 45, a fluidizing gas source which is the gas source 1 in the exemplary embodiment. However, independent sources for the propellant gas and for the fluidizing gas may also be provided. By means of the adjusting valve 21 and the regulating valve 45, the respective gas streams can be set independently of one another. If a plurality of regulating valves 45 are provided, as in the exemplary embodiment illustrated, they can advantageously be set independently of one another. For this purpose, expediently, the lower space 42 is provided with a partition 46 which is arranged in such a way that a supply connection 43 with a regulating valve 45 is located on each of the two sides.

The device is operated as follows: propellant gas is supplied to the conveying pipe 3 via the blower 1 and the supply line 2. The propellant gas flows axially along the conveying path 33 through the conveying pipe 3 through the portions 30 to 35. In the portion 32, the bulk material 6 is introduced into the conveying pipe 3 from above via the bulk material feed means 5. Via the delivery line 44, the regulating valve 45 and the supply connection 43, fluidizing gas flows into the lower space 42 of the fluidizing pipe segment 4 and finally flows through the ventilation surface 40 transversely to the conveying path 33 into the conveying pipe 3. The fluidizing gas impinges onto the bulk material 6 supplied and generates a fluidized bed in the latter, that is to say it brings about a fluidization of the bulk material. The bulk material thus fluidized can be adsorbed and moved by the propellant gas flowing in the direction of the conveying path 33, in the same way as a fluid, that is to say with only insignificant internal friction.

In a proven embodiment, it became clear that it was beneficial to have set the gas quantity of the fluidizing gas in such a way that it amounts to at least three times the loosening velocity of the respective solid matter of the bulk material. In a test conveying device, which, with a conveying pipe diameter $D_R$ of 100 mm and a conveying distance of 30 m, transports fly ash as bulk material, what can be achieved by the fluidizable pipe segments according to the invention is that, both in the operating mode of the suction conveyance and in the operating mode of pressure conveyance, the total conveying gas requirement can be markedly reduced, as compared with conventional pipe conveyance. The total conveying gas requirement is understood in this case to mean the sum of the propellant gas requirement and the fluidizing gas requirement. Furthermore, the initial velocity of the propellant gas can be lowered, as compared with the pipe-type conveying devices known from the prior art, specifically, in particular, in suction operation. It was possible to reduce the initial gas velocity of the propellant gas from values substantially above 10 m per second in the case of conventional pipe-type conveying devices to a velocity of about 4 m per second. This resulted in stable and, at the same time, pulsation-free operation. Furthermore, it was possible for the fluidizing pipe segment having the bulk material feed means to be arranged horizontally or at an upward inclination. Ascents of 0° to about 30° were overcome in the test.

Figure 3:
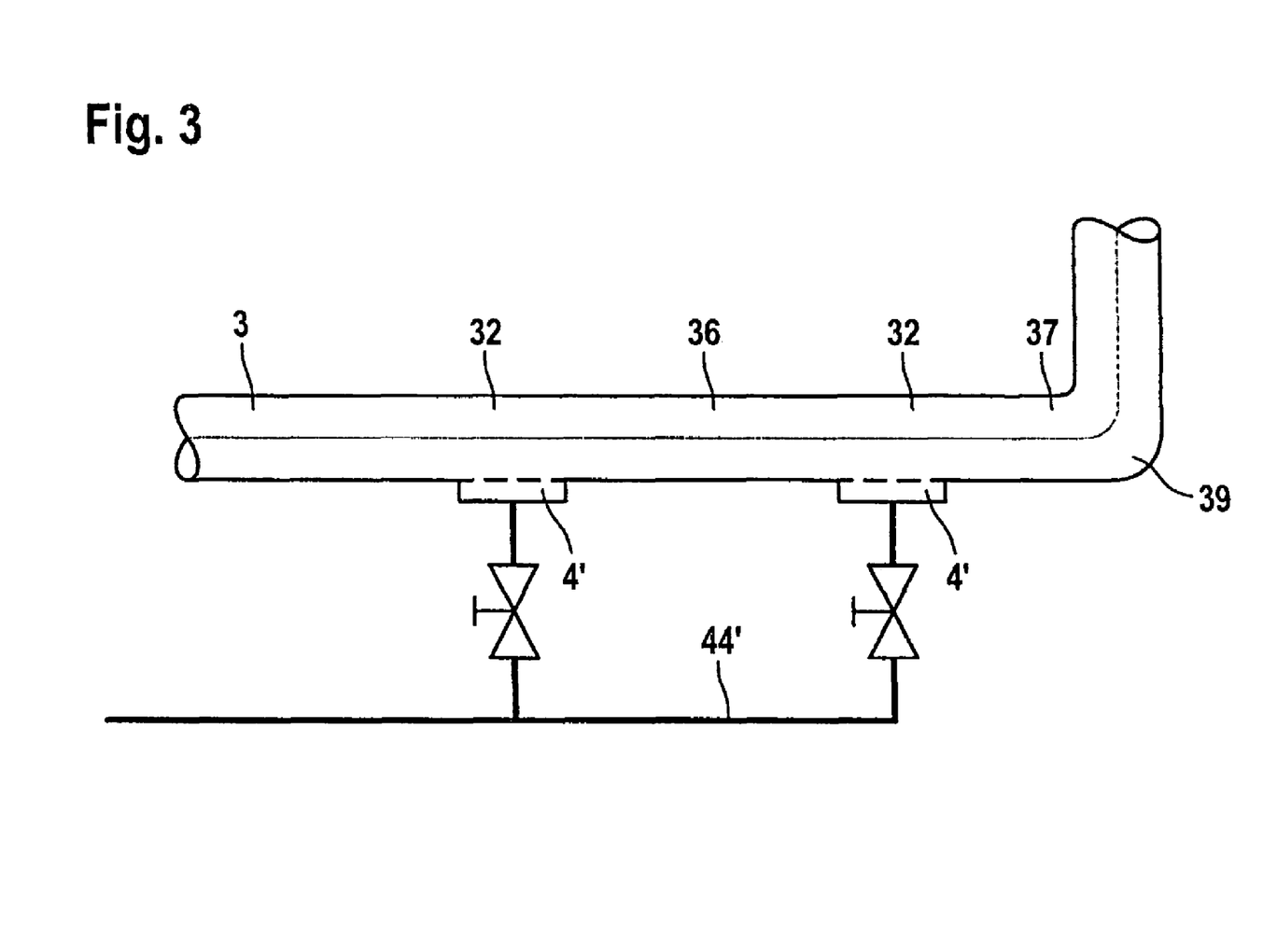
FIG. 3 shows a diagrammatic illustration of another portion of the conveying device according to the invention.

FIG. 3 illustrates the conveying pipe 3 with long straight portions 36, 37 which lead to a bend 39 as a deflection element. In conventional pipe-type conveying devices, there is a tendency for the bulk material partially to fall out of the propellant gas stream, so that accumulations of bulk material are formed locally. This may lead to the formation of skeins and to sudden slug formation. In order to counteract this, fluidizing pipe segments 4' are used in long horizontal straight sections at points which can easily be determined by measurement on the respective conveying device and where accumulations of bulk material often occur. By fluidizing gas being supplied to the fluidizing pipe segments 4' via the delivery line 44', fluidizing gas is blown into the conveying pipe 3 transversely to the conveying path 33 at the points where the bulk material tends to accumulate. As a result, possible accumulations of bulk material are fluidized and moved further on by the propellant gas before it can be deposited in a critical quantity. The risk of slug formation and the resulting risks of blockage of the line and of pressure knocks, which may lead to the conveying pipe 3 being damaged and destroyed, are consequently counteracted.

The determination of the points having a tendency to accumulations of bulk material can preferably be carried out by the gas holding capacity being determined.

Figure 4:
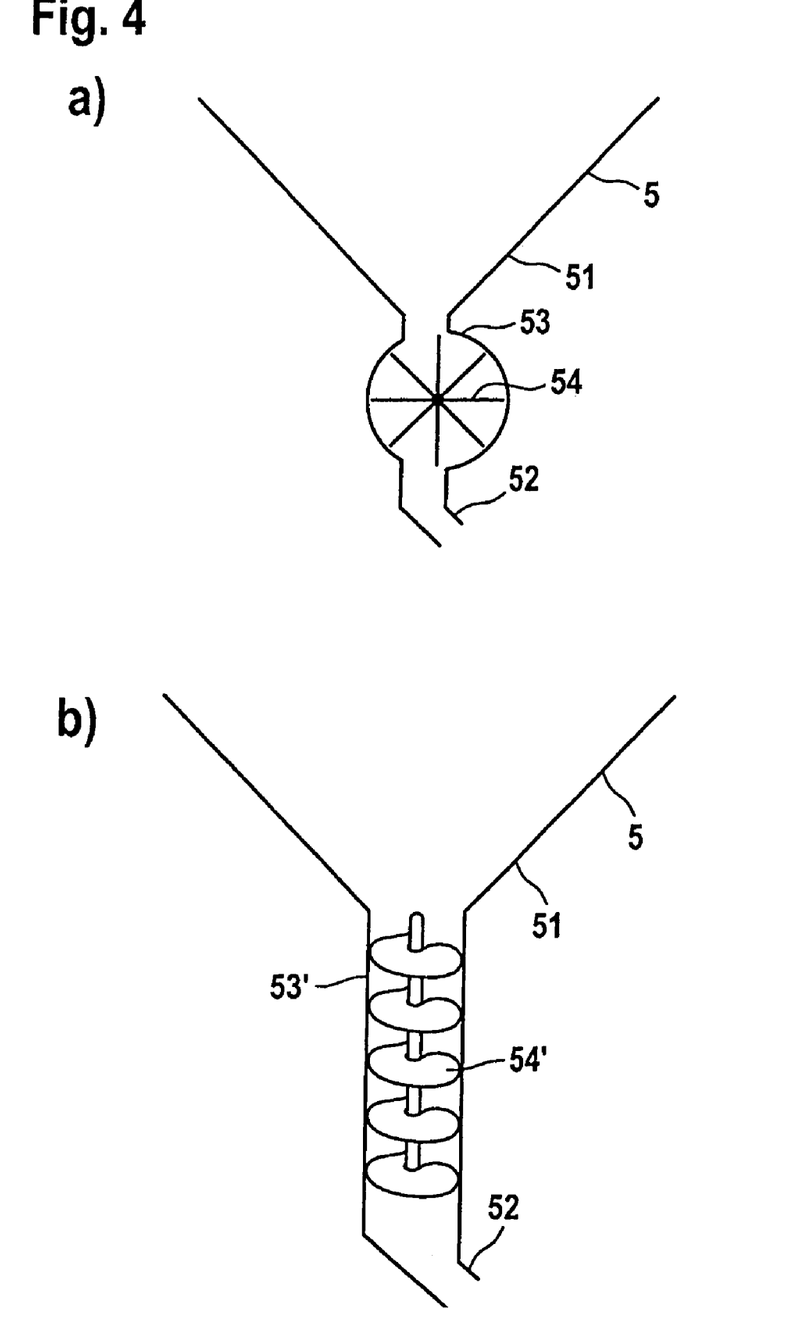
FIG. 4 shows a view, in the form of a detail, of a bulk material feed means of the conveying device according to the invention.

FIG. 4 illustrates a view of the bulk material feed means in the form of a detail. At the lower end of the funnel-like shape 51 is arranged a pressure sluice 53. The latter has a volumetric conveying means which, in the exemplary embodiment illustrated in FIG. 4*a*, is designed as a cellular wheel conveyor 54. The pressure sluice 53 serves for guiding the bulk material 6 located in the funnel-like shape 51 via the delivery line 52 into the conveying pipe 3 which is under pressure. So that there is no uncontrolled blowback of propellant and/or fluidizing gas into the bulk material feed means 5, the pressure sluice 53 is provided. It conveys the bulk material 6, which is under atmospheric pressure in the funnel-like shape 51, into the delivery line 52 which is under the pressure of the conveying pipe 3.

Since, according to the invention, only a low propellant gas velocity and therefore a low propellant gas stream are required, the conveying pipe 3 is under only a relatively low pressure. Even during operation, the pressure prevailing in the conveying pipe 3 remains constantly low, since, owing to the configuration according to the invention with the fluidizing pipe segments arranged in portions, a uniform pulsation-free conveyance is achieved, with the result that the occurrence of pressure peaks, such as could occur in the event of pulsations, is largely avoided. This makes it possible to provide a simplified pressure sluice 53 instead of the complicated pressure vessels required in the prior art. It can preferably be designed as a conveying means operating volumetrically, such as, for example, as a cellular wheel conveyor 54 or, in the case of another embodiment of the pressure sluice 53', as a worm conveyor 54'. It is a particular advantage of the invention that, by virtue of the uniform and pulsation-free conveyance, such pressure sluices can be used which are much less complicated in structural terms than the pressure vessels used conventionally.

The invention claimed is:

1. A device for the pneumatic conveyance of bulk material, comprising a conveying pipe which defines a conveying path for the bulk material, a plurality of fluidizing pipe segments arranged discontinuously in portions at discrete locations along the conveying path, at least one of which is arranged at least at horizontal or upwardly inclined sections, a propellant gas source which is connected to the conveying pipe and is configured so as to supply propellant gas in the direction of the conveying path and a bulk material feeder disposed in a region near one of the fluidizing pipe segments, at least one of the fluidizing pipe segments being arranged at a point at which the bulk material feeder feeds the bulk material to the conveying path.

2. The device as claimed in claim 1, wherein at least one of the fluidizing pipe segments has a ventilation bottom with a fluidizing path supply.

3. The device as claimed in claim 1 or 2, further comprising an additional fluidizing pipe segment arranged at a slug formation point.

4. The device as claimed in claim 1 or 2, wherein the angle of inclination of the fluidizing pipe segments to the conveying path is between 0° and +45°.

5. The device as claimed in claim 1 or 2, wherein the device further comprises a deflection element, the fluidizing pipe segments being arranged so as to be spaced apart from the deflection element.

6. The device as claimed in claim 1 or 2, wherein the bulk material feeder comprises a pressure sluice which is designed as a volumetric conveyor.

7. The device as claimed in claim 6, wherein the volumetric conveyor is a cellular wheel conveyor or worm conveyor.

8. The device as claimed in claim 3, wherein the device further comprises a deflection element, the fluidizing pipe segments being arranged so as to be spaced apart from the deflection element.

9. The device as claimed in claim 4, wherein the device further comprises a deflection element, the fluidizing pipe segments being arranged so as to be spaced apart from the deflection element.

10. The device as claimed in claim 3, wherein the angle of inclination of the fluidizing pipe segments to the conveying path is up to +30°.

11. The device as claimed in claim 5, wherein the angle of inclination of the fluidizing pipe segments to the conveying path is up to +30°.

* * * * *

UNITED STATES PATENT AND TRADEMARK OFFICE
CERTIFICATE OF CORRECTION

PATENT NO. : 7,144,204 B2
APPLICATION NO. : 10/490341
DATED : December 5, 2006
INVENTOR(S) : Peter Hilgraf It is certified that error appears in the above-identified patent and that said Letters Patent is hereby corrected as shown below:

Title Page, and Col. 1 line 1
The title of the invention should read: --PNEUMATIC CONVEYING DEVICE AND CONVEYING METHOD --.

In column 7, line 31, delete "DR" and replace with -- $D_R$ --.

In column 7, line 40, delete "DR" and replace with -- $D_R$ --.

Signed and Sealed this

Third Day of April, 2007

JON W. DUDAS
*Director of the United States Patent and Trademark Office*